United States Patent
Chang et al.

(10) Patent No.: US 8,300,433 B2
(45) Date of Patent: Oct. 30, 2012

(54) ISOLATED PRIMARY CIRCUIT REGULATOR

(75) Inventors: Lon-Kou Chang, Hsinchu (TW);
Tsung-Hsien Lu, Hsinchu (TW);
Ruei-Ming Gan, Hsinchu (TW)

(73) Assignee: Macroblock, Inc., Hsinchu (TW)

(*) Notice: Subject to any disclaimer, the term of this patent is extended or adjusted under 35 U.S.C. 154(b) by 397 days.

(21) Appl. No.: 12/817,884

(22) Filed: Jun. 17, 2010

(65) Prior Publication Data
US 2011/0242859 A1     Oct. 6, 2011

(30) Foreign Application Priority Data
Apr. 2, 2010 (TW) ................. 99110457 A (51) Int. Cl.
*H02M 3/335* (2006.01)
(52) U.S. Cl. .................. 363/21.16; 363/21.18
(58) Field of Classification Search ............ 363/21.16, 363/21.18
See application file for complete search history.

(56) References Cited

U.S. PATENT DOCUMENTS

| | | | | |
|---|---|---|---|---|
| 5,717,578 A * | 2/1998 | Afzal | ........................ | 320/111 |
| 6,977,824 B1 * | 12/2005 | Yang et al. | ................ | 363/21.16 |
| 7,558,093 B1 * | 7/2009 | Zheng | ........................ | 363/97 |
| 2008/0007977 A1 * | 1/2008 | Piper et al. | ................ | 363/21.16 |

FOREIGN PATENT DOCUMENTS
TW     I277852     4/2007
* cited by examiner

*Primary Examiner* — Adolf Berhane
*Assistant Examiner* — Gary Nash
(74) *Attorney, Agent, or Firm* — Morris Manning & Martin LLP; Tim Tingkang Xia, Esq.

(57) ABSTRACT

An isolated primary circuit regulator is applied to a primary side of a transformer of a power supply. The isolated primary circuit regulator outputs a switching signal, and switches the transformer by using the switching signal, thereby stabilizing an output current. The isolated primary circuit regulator includes a discharge time detector, an oscillator, a pulse width modulator and a control circuit. The discharge time detector is used for detecting a discharge time of a switching current generated at a secondary side of the transformer. The oscillator is used for generating an oscillation signal. The control circuit is used for outputting an adjustment signal. The pulse width modulator outputs a switching signal according to the oscillation signal output by the oscillator and the adjustment signal output by the control circuit. The switching signal has a duty cycle and a frequency corresponding to the oscillation signal and the adjustment signal.

4 Claims, 6 Drawing Sheets

ISOLATED PRIMARY CIRCUIT REGULATOR

CROSS-REFERENCE TO RELATED APPLICATIONS

This non-provisional application claims priority under 35 U.S.C. §119(a) on Patent Application No(s). 099110457 filed in Taiwan, R.O.C. on Apr. 2, 2010, the entire contents of which are hereby incorporated by reference.

BACKGROUND OF THE INVENTION

1. Field of the Invention

The present invention relates to an isolated primary circuit regulator, and more particularly to an isolated primary circuit regulator having a control circuit.

2. Related Art

In current electronic devices, in order to meet the safety requirements, a power supply is required to be capable of providing a stable output voltage and a stable output current. Under such conditions, the power supply is mostly composed of a transformer, and a switching regulator is disposed at a primary side of the transformer to adjust the output current. However, among transformer-related designs disclosed in the prior art, the technology of disposing the switching regulator at the primary side of the transformer still cannot accurately control the output current of the power supply. Therefore, an additional current loop is required at a secondary side of the power supply, so as to achieve a constant current curve with linear characteristics. As a result, the manufacturing cost is greatly increased. Therefore, how to accurately control the output current of the power supply while reducing the cost is indeed a research subject of interest.

Currently, the method of adjusting the output current of the power supply by disposing the switching regulator at the primary side of the transformer is characterized by detecting a primary-side switching voltage signal and a discharge time of a secondary-side switching current. The primary-side switching voltage signal is generated at the primary side of the transformer, and the secondary-side switching current is generated at the secondary side of the transformer. For related technologies and studies, reference is made to ROC Patent No. I277852, which discloses a switching control circuit controlling output current at the primary side of a power converter, including as follows: A waveform detector generates a current-waveform signal. A discharge-time detector detects a discharge-time of a secondary side switching current. An oscillator generates an oscillation signal for determining the switching frequency of the switching signal. An integrator generates an integrated signal by integrating an average current signal with the discharge-time. The average current signal is generated in response to the current-waveform signal. The time constant of the integrator is correlated with the switching period of the switching signal, therefore the integrated signal is proportional to the output current. An error amplifier amplifies the integrated signal and provides a loop gain for output current control. A comparator controls the pulse width of the switching signal in reference to the output of the error amplifier. The technical means disclosed in the patent uses a current sensing terminal to directly detect a primary-side switching voltage signal generated at the primary side of the transformer of the power supply. However, it should be noted that, although the output current of the power supply can be stabilized and adjusted by the technical feature, a voltage spike caused by sudden switching of a switch would occur, resulting in false determination of the switching regulator. Moreover, the integrator and the waveform detector increase the manufacturing cost of the switching regulator.

SUMMARY OF THE INVENTION

In view of the above problems of the prior art, the present invention is an isolated primary circuit regulator, applied to a primary side of a transformer of a power supply.

The isolated primary circuit regulator comprises a discharge time detector, an oscillator, a pulse width modulator, and a control circuit.

The discharge time detector is connected to the transformer. It is used for detecting a discharge time of a switching current generated at a secondary side of the transformer, and outputting a discharge time signal and an inverse discharge time signal.

The control circuit has an input terminal connected to the discharge time detector, and is used for performing signal processing of output current waveform reconstruction, filtering, amplification and comparison on a critical voltage according to the discharge time signal and the inverse discharge time signal, and outputting an adjustment signal. The critical voltage is corresponding to a peak value of a switching voltage signal generated at the primary side of the transformer.

The oscillator is used for generating an oscillation signal.

A first input terminal and a second input terminal of the pulse width modulator are respectively connected to the control circuit and the oscillator. The pulse width modulator is used for receiving the oscillation signal and the adjustment signal, and outputting a switching signal accordingly. The switching signal has a duty cycle and a frequency corresponding to the oscillation signal and the adjustment signal, and the adjustment signal is used for resetting the pulse width modulator.

The isolated primary circuit regulator of the present invention can switch the transformer by using the switching signal to stabilize and to adjust the output current of the power supply. Moreover, the isolated primary circuit regulator of the present invention further uses the control circuit to replace the conventional waveform detector and integrator. Therefore, the isolated primary circuit regulator of the present invention does not directly detect the switching voltage signal generated at the primary side of the transformer, but indirectly obtains the equivalent critical voltage through the feedback design of the control circuit. The isolated primary circuit regulator of the present invention not only can stabilize and adjust the output current of the power supply, but further prevent the false determination due to the voltage spike caused by sudden switching of a switch.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
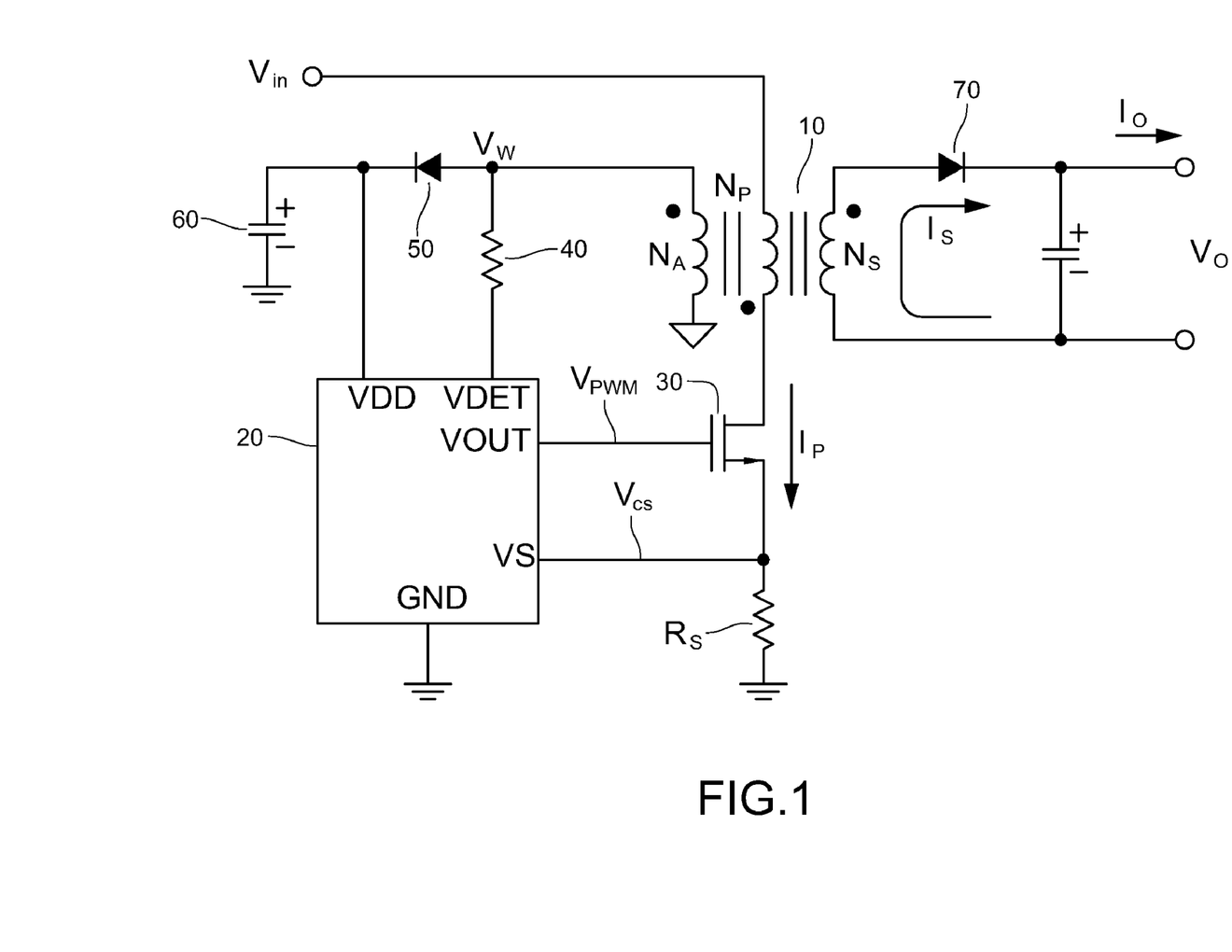
FIG. 1 is a schematic view of an isolated primary circuit regulator disposed in a power supply according to the present invention.

FIG. 1 is a schematic view of an isolated primary circuit regulator 20 disposed in a power supply according to an embodiment of the present invention.

The isolated primary circuit regulator 20 is applied to a primary side of a transformer 10 of a power supply. The power supply has an input voltage $V_{in}$, an output voltage $V_o$, and an output current $I_o$.

The power supply comprises the transformer 10, and the transformer 10 has an auxiliary winding $N_A$, a primary-side winding $N_P$ and a secondary-side winding $N_S$.

The primary side is defined as a side reference to exactly the same ground level of the input voltage $V_{in}$, and the secondary side is defined as a side reference to exactly the same ground level of the output voltage $V_o$.

The isolated primary circuit regulator 20 comprises a power supply terminal VDD, a ground terminal GND, an output terminal VOUT, a discharge time detection terminal VDET and a switching voltage sensing terminal VS.

The power supply terminal VDD is connected to one terminal of a capacitor 60, and the other terminal of the capacitor 60 is grounded in the primary side. In addition, a node between the power supply terminal VDD and the capacitor 60 is connected to the auxiliary winding $N_A$ through a rectifier 50.

The ground terminal GND is grounded. The output terminal VOUT is connected to a gate terminal of a transistor 30. The discharge time detection terminal VDET is connected to the auxiliary winding $N_A$ through an auxiliary resistor 40. The switching voltage sensing terminal VS is disposed between a source terminal of the transistor 30 and a detection resistor $R_S$. The detection resistor $R_S$ is used for connecting the source terminal of the transistor 30 to the ground.

The isolated primary circuit regulator 20 detects a reflected voltage $V_W$ through the discharge time detection terminal VDET, and detects a primary-side switching voltage signal $V_{cs}$ corresponding to a primary-side switching current $I_P$ generated at the primary side of the transformer through the switching voltage sensing terminal VS, generates a switching signal $V_{PWM}$ according to the reflected voltage $V_W$ and the primary-side switching voltage signal $V_{cs}$, and outputs the generated switching signal $V_{PWM}$ through the output terminal VOUT.

Here, the isolated primary circuit regulator 20 switches the transistor 30 by using the switching signal $V_{PWM}$, so as to control the switching operation of the transformer 10.

The primary-side switching voltage signal $V_{cs}$ may be a magnetizing current signal. The reflected voltage $V_W$ further charges the capacitor 60 through the rectifier 50, such that the reflected voltage $V_W$ supplies energy to the isolated primary circuit regulator 20.

When the switching signal $V_{PWM}$ is at a high level, the transistor 30 is turned on, and the transistor 30 conducts the primary-side switching current $I_P$. When the switching signal $V_{PWM}$ is switched to a low level, the energy stored in the transformer 10 is released to the secondary side of the transformer 10, and is transmitted to an output terminal of the power supply through a rectifier 70.

When the transistor 30 is turned on, the transistor 30 conducts the primary-side switching current $I_P$ at the primary side of the transformer. The primary-side switching current $I_P$ is converted into the primary-side switching voltage signal $V_{cs}$ by the detection resistor $R_S$, and through the switching voltage sensing terminal VS, the primary-side switching voltage signal $V_{cs}$ is detected. The primary-side switching current $I_P$ increases with the conduction time of the transistor 30, and reaches a maximum primary-side switching current $I_{pk}$.

The voltage value of the primary-side switching voltage signal $V_{cs}$ also increases with the conduction time of the transistor 30, and eventually reaches a critical voltage $V_e$. The critical voltage $V_e$ is a peak value of the primary-side switching voltage signal $V_{cs}$. The detection resistor $R_S$ has a fixed resistance, and the critical voltage $V_e$ is directly proportional to the maximum primary-side switching current $I_{pk}$, as expressed in Equation (1).

$$V_e = I_{pk} * R_S \tag{1}$$

Figure 2:
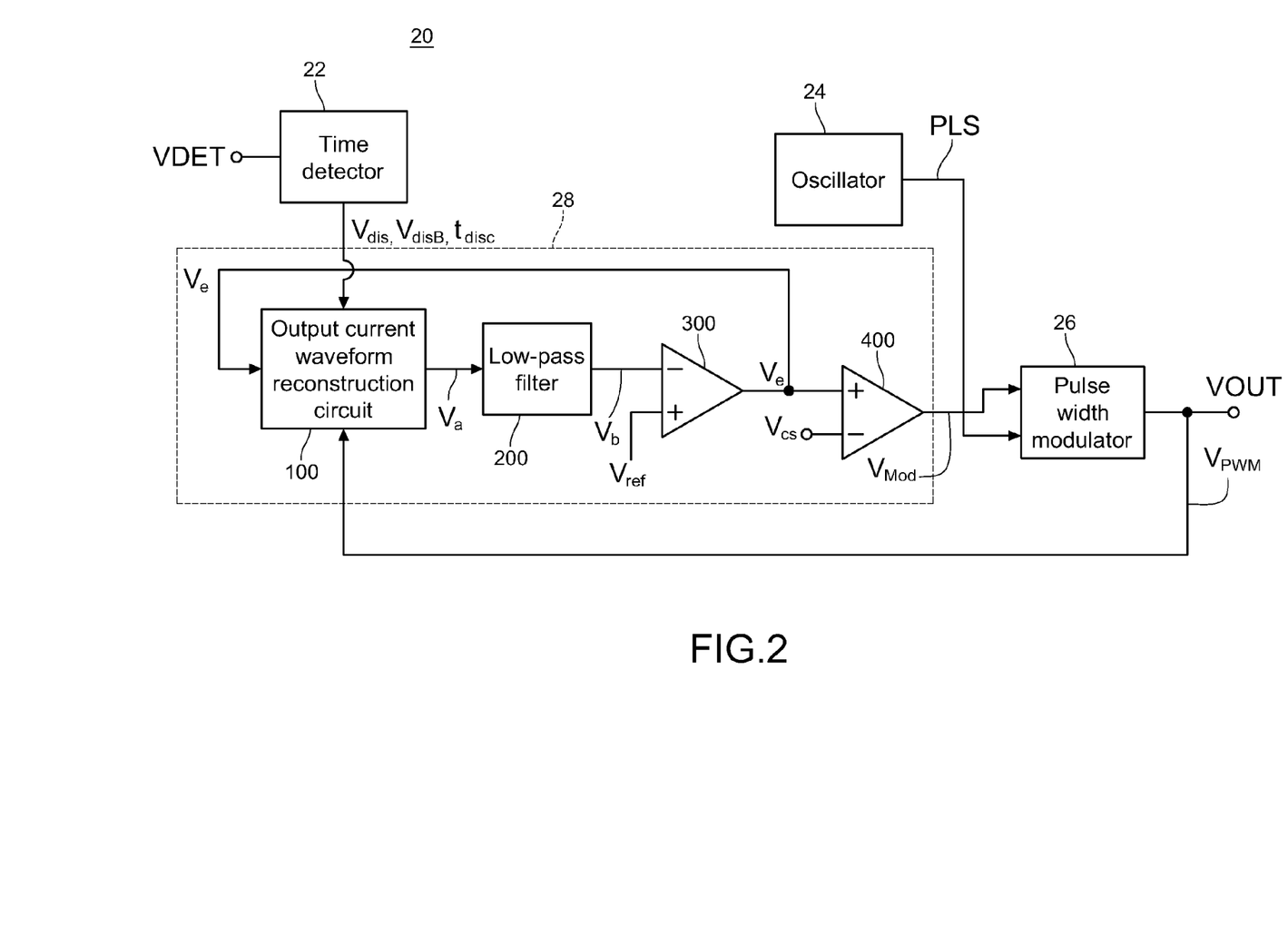
FIG. 2 is a schematic view of an isolated primary circuit regulator according to an embodiment of the present invention.

Referring to FIG. 2, the isolated primary circuit regulator 20 may comprise a discharge time detector 22, an oscillator 24, a pulse width modulator 26 and a control circuit 28 disposed therein.

An input terminal of the discharge time detector 22 is connected to the discharge time detection terminal VDET. An output terminal of the discharge time detector 22 is connected to an input terminal of the control circuit 28.

A first input terminal and a second input terminal of the pulse width modulator 26 are respectively connected to the control circuit 28 and the oscillator 24. The pulse width modulator 26 is used for outputting the switching signal $V_{PWM}$, and the switching signal $V_{PWM}$ is connected to a gate terminal of the transistor 30 through the output terminal VOUT.

The discharge time detector 22 detects the reflected voltage $V_W$ through the discharge time detection terminal VDET, and thus provides a discharge time signal $V_{dis}$ and an inverse discharge time signal $V_{disB}$ to the control circuit 28. The discharge time signal $V_{dis}$ and the inverse discharge time signal $V_{disB}$ possess opposite phases.

Figure 3:
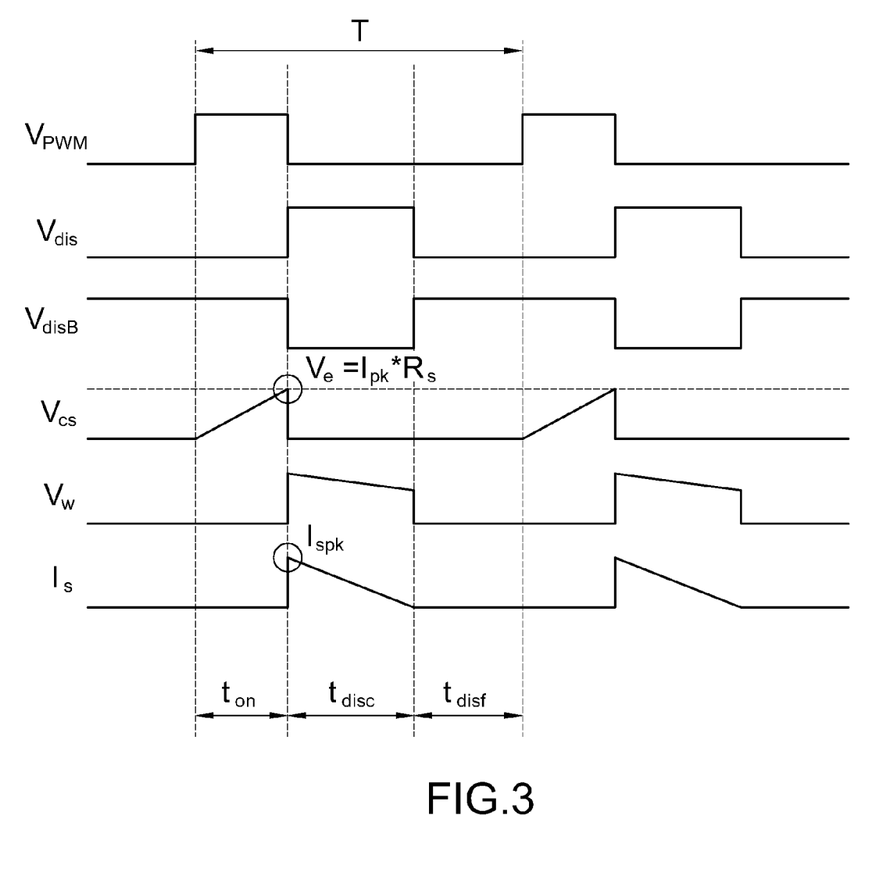
FIG. 3 is a diagram depicting signal waveforms during operation of the power supply of FIG. 1.

Referring to FIG. 3, in the discharge period, a secondary-side switching current $I_s$ is formed at the secondary side of the transformer, and the reflected voltage $V_W$ is hereby generated at the primary side of the transformer in response to the secondary-side switching current $I_s$. At the instance when the switching signal $V_{PWM}$ is switched to a low level, the secondary-side switching current $I_s$ has a maximum secondary-side switching current $I_{spk}$. When the secondary-side switching current $I_s$ gradually decreases as the discharge period proceeds, and the secondary-side switching current $I_s$ eventually drops to zero, causing the reflected voltage $V_W$ to drop simultaneously.

The maximum secondary-side switching current $I_{spk}$ is directly proportional to the maximum primary-side switching current $I_{pk}$, as expressed in Equation (2).

$$I_{spk} = I_{pk} * N_P/N_S \tag{2}$$

FIG. 3 is a diagram depicting waveforms measured in experiments according to an embodiment of the present invention. As can be seen from FIG. 3, a discharge time $t_{disc}$ of the secondary-side switching current $I_s$ can be calculated according to the time span starting from the instance when the switching signal $V_{PWM}$ is switched to a low level to the instance when the secondary side switching current $I_s$ drops to zero.

Since the discharge time detector 22 detects the secondary-side switching current $I_s$ (by receiving the reflected voltage $V_W$) through the discharge time detection terminal VDET, the discharge time detector 22 can obtain the discharge time $t_{disc}$ of the secondary-side switching current $I_s$ by calculating the time span starting from the instance when the switching signal $V_{PWM}$ is switched to a low level to the instance when the secondary side switching current $I_s$ drops to zero. Therefore, the discharge time detector 22 can effectively detect the discharge time $t_{disc}$.

The oscillator 24 is used for generating an oscillation signal (or a clock signal) PLS.

An input terminal of the control circuit 28 is connected to the discharge time detector 22. The control circuit 28 receives the discharge time signal $V_{dis}$ and the inverse discharge time signal $V_{disB}$ corresponding to the discharge time $t_{disc}$ through such a connection. In addition, the control circuit 28 performs signal processing of output current waveform reconstruction, filtering, amplification and comparison on the critical voltage $V_e$ according to the discharge time signal $V_{dis}$, the inverse discharge time signal $V_{disB}$ and the switching signal $V_{PWM}$ so as to output an adjustment signal $V_{Mod}$.

The pulse width modulator 26 receives the adjustment signal $V_{Mod}$ from the control circuit 28 and the oscillation signal PLS from the oscillator 24 respectively through the first input terminal and the second input terminal.

Figure 4A:
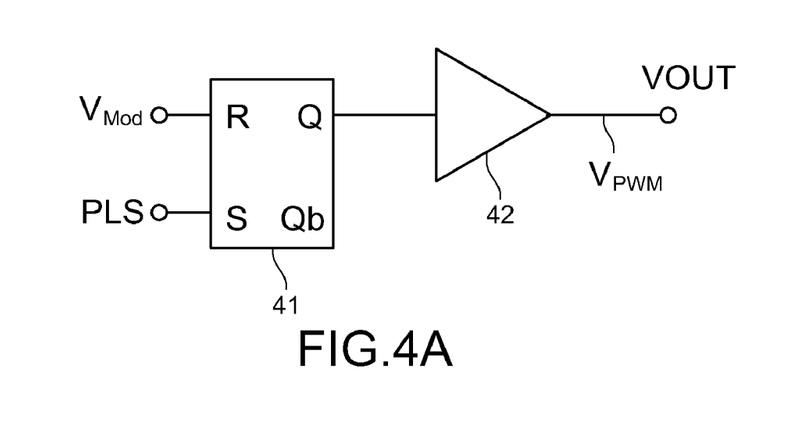
FIG. 4A is a schematic view of a pulse width modulator according to an embodiment of the present invention.

Referring to FIG. 4A, the pulse width modulator 26 comprises an SR latch 41 and a gate driver 42.

The gate driver 42 is connected to an output terminal of the SR latch 41. The SR latch 41 performs signal processing according to the oscillation signal PLS and the adjustment signal $V_{Mod}$, and then the gate driver 42 outputs the switching signal $V_{PWM}$. The switching signal $V_{PWM}$ possesses a duty cycle and a frequency corresponding to the oscillation signal PLS and the adjustment signal $V_{Mod}$, and the adjustment signal $V_{Mod}$ is used for resetting the pulse width modulator 26.

Figure 4B:
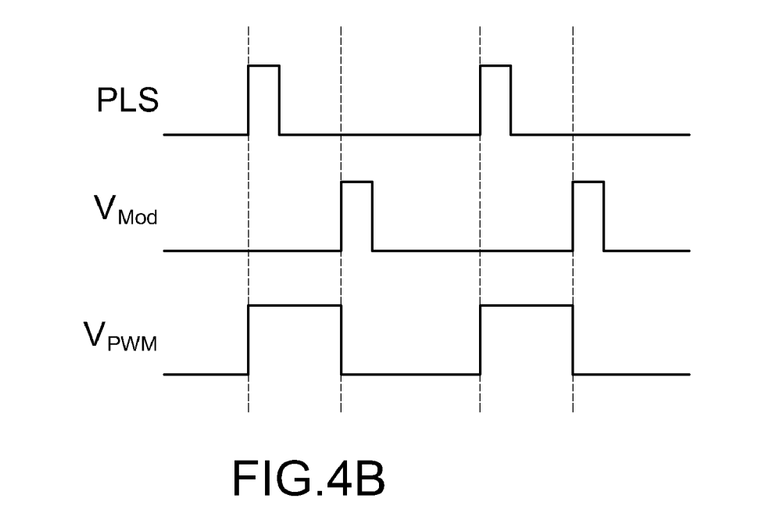
FIG. 4B is a diagram depicting signal waveforms of a pulse width modulator according to an embodiment of the present invention.

As shown in FIG. 4B, the oscillation signal PLS is used for determining when the switching signal $V_{PWM}$ is switched to the high level, and the adjustment signal $V_{Mod}$ is used for determining when the switching signal $V_{PWM}$ is switched to the low level.

According to an embodiment of the present invention, as shown in FIG. 2, the control circuit 28 comprises an output current waveform reconstruction circuit 100, a low-pass filter 200, an error amplifier 300 and a comparator 400.

The output current waveform reconstruction circuit 100 is used for sampling and holding the critical voltage $V_e$ according to the switching signal $V_{PWM}$, the discharge time signal $V_{dis}$ and the inverse discharge time signal $V_{disB}$, so as to reconstruct a current waveform which is corresponding to twice the current waveform of the output current $I_o$ occurred at the secondary side After performing correction using a corresponding coefficient, the output current waveform reconstruction circuit 100 finally outputs a square wave signal $V_a$.

The square wave signal $V_a$ has an amplitude corresponding to the critical voltage $V_e$, the square wave signal $V_a$ is synchronized to the discharge time signal $V_{dis}$, and the square wave signal $V_a$ has a waveform corresponding to a waveform of the output current $I_o$.

The low-pass filter 200 is connected to the output current waveform reconstruction circuit 100. The low-pass filter 200 is used for filtering the square wave signal $V_a$, so as to output a direct current (DC) signal $V_b$.

A negative input terminal of the error amplifier 300 is connected to the DC signal $V_b$. A positive input terminal of the error amplifier 300 is connected to a reference voltage $V_{ref}$. The error amplifier 300 is used for amplifying a difference between the DC signal $V_b$ and the reference voltage $V_{ref}$, and the error amplifier 300 outputs the critical voltage $V_e$. The reference voltage $V_{ref}$ is preset according to the output current $I_o$. For example, when the output current $I_o$ is 0.7 A, the reference voltage $V_{ref}$ may be set to 0.7 V.

Here, the critical voltage $V_e$ output by the error amplifier 300 is fed back to an input terminal of the output current waveform reconstruction circuit 100. Through the feedback, the output current waveform reconstruction circuit 100 can receive a voltage equivalent to the primary-side switching voltage signal $V_{cs}$, thereby preventing false determination of a switching regulator caused by sudden switching of a switch.

The comparator 400 is connected between the error amplifier 300 and the pulse width modulator 26. The comparator 400 is used for comparing the critical voltage $V_e$ to the primary-side switching voltage signal $V_{cs}$, and the comparator 400 outputs the adjustment signal $V_{mod}$.

Figure 5:
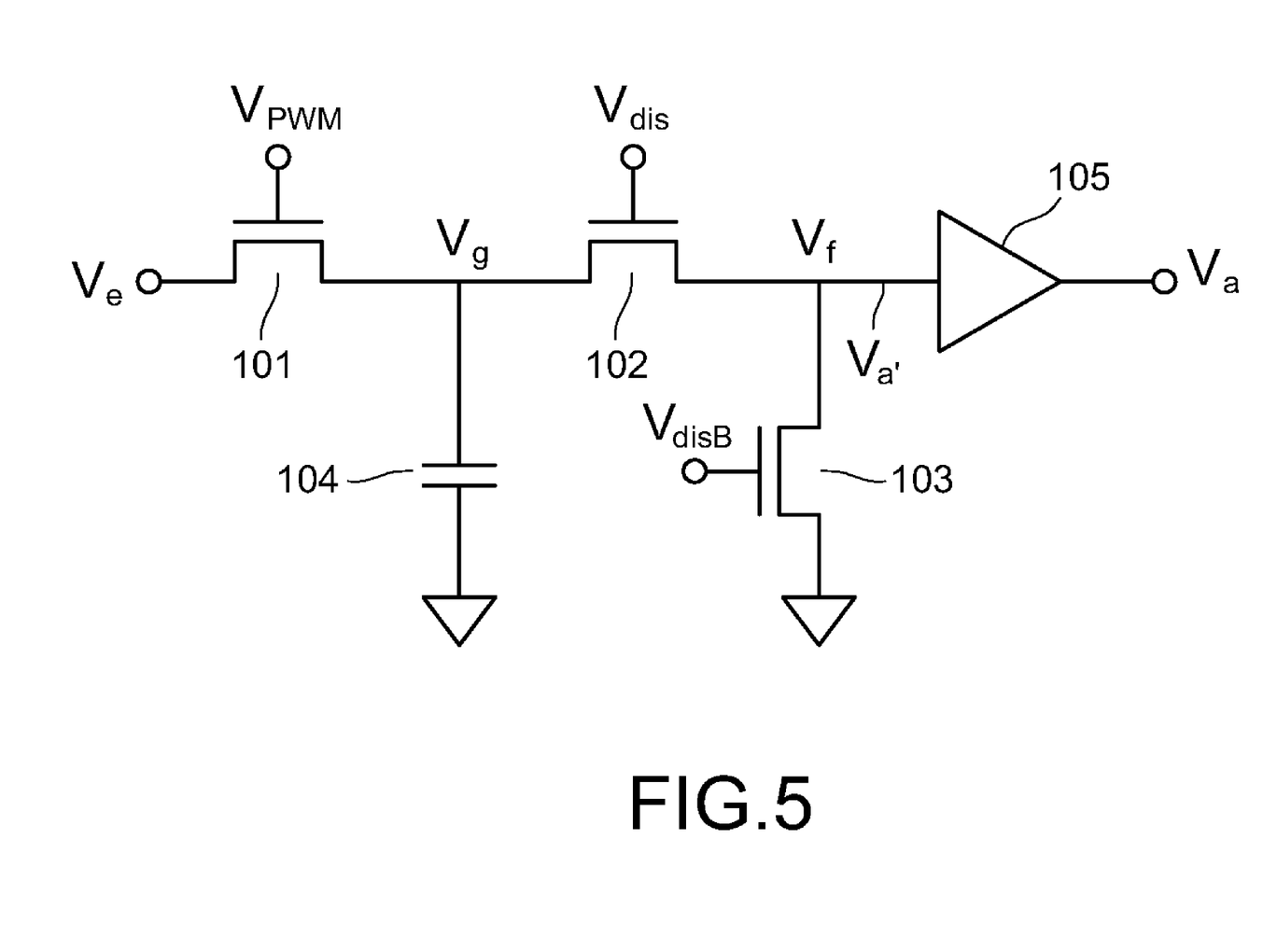
FIG. 5 is a schematic view of an output current waveform reconstruction circuit according to an embodiment of the present invention.

According to an embodiment of the present invention, referring to FIG. 5, the output current waveform reconstruction circuit 100 comprises a first switch 101, a second switch 102, a third switch 103, a first capacitor 104 and a buffer 105.

The first switch 101 is connected to the critical voltage $V_e$, and the second switch 102 is connected in series with the first switch 101. The third switch 103 is connected to the second switch 102, and connected in parallel with the first switch 101 and the second switch 102. The first capacitor 104 is connected to a first node between the first switch 101 and the second switch 102. The buffer 105 is connected to a second node between the second switch 102 and the third switch 103. Between the first switch 101 and the second switch 102, a first detection terminal $V_g$ is provided. At a common node between the buffer 105, the second switch 102 and the third switch 103, a second detection terminal $V_f$ is provided. The switching signal $V_{PWM}$ is used for controlling the first switch 101. The discharge time signal $V_{dis}$ is used for controlling the second switch 102. The inverse discharge time signal $V_{disB}$ is used for controlling the third switch 103.

Referring to FIG. 3, when the switching signal $V_{PWM}$ is at the high level, the transistor 30 is turned on, and the transistor 30 conducts the primary-side switching current $I_P$. During this interval, the secondary-side switching current $I_s$ is zero. Therefore, it is defined that a time interval during which the switching signal $V_{PWM}$ is at the high level as a high-level time interval $t_{on}$. During the high-level time interval $t_{on}$, the switching signal $V_{PWM}$ is at the high level, the discharge time signal $V_{dis}$ is at the low level, and the inverse discharge time signal $V_{disB}$ is at the high level.

Next, after the high-level time interval $t_{on}$, the switching signal $V_{PWM}$ is switched to the low level. Accordingly, the energy originally stored in the transformer 10 is released to the secondary side of the transformer 10, and the secondary-side switching current $I_s$ is hereby generated. As the energy is released to the secondary side of the transformer 10, the secondary-side switching current $I_s$ gradually decreases and eventually drops to zero. Therefore, it is defined that, a time interval from the instance when the switching signal $V_{PWM}$ is switched to the low level to the instance when the secondary-side switching current $I_s$ drops to zero as the discharge time $t_{disc}$. During the time interval of the discharge time $t_{dis}$, the switching signal $V_{PWM}$ is at the low level, the discharge time signal $V_{dis}$ is at the high level, and the inverse discharge time signal $V_{disB}$ is at the low level.

Then, a time interval from the instance when the switching signal $V_{PWM}$ is still at the low level and the secondary-side switching current $I_s$ drops to zero to the instance when the switching signal $V_{PWM}$ is again switched to the high level is defined as a low-level time interval $t_{disf}$. During the low-level time interval $t_{disf}$, the switching signal $V_{PWM}$ is at the low level, the discharge time signal $V_{dis}$ is at the low level, and the inverse discharge time signal $V_{disB}$ is at the high level.

Therefore, it is straightforward that $T=t_{on}+t_{disc}+t_{disf}$, wherein T is the period of the switching signal $V_{PWM}$.

The output current waveform reconstruction circuit 100 has an input terminal for receiving the critical voltage $V_e$ output and fed back by the output of the error amplifier 300. Referring to FIGS. 3 and 5, during the high-level time interval $t_{on}$, the switching signal $V_{PWM}$ is at the high level, the discharge time signal $V_{dis}$ is at the low level, and the inverse discharge time signal $V_{disB}$ is at the high level. Therefore, the first switch 101 and the third switch 103 are switched off, and the second switch 102 is switched on. At this time, the value of the critical voltage $V_e$ is transmitted to and stored in the first capacitor 104, the voltage value of the first detection terminal $V_g$ is corresponding to the critical voltage $V_e$, and the second detection terminal $V_f$ is grounded.

After the high-level time interval $t_{on}$, the switching signal $V_{PWM}$ is switched to the low level, and the output current waveform reconstruction circuit 100 starts to operate at the onset of the time interval of the discharge time $t_{disc}$. During the time interval of the discharge time $t_{disc}$, the switching signal $V_{PWM}$ is at the low level, the discharge time signal $V_{dis}$ is at the high level, and the inverse discharge time signal $V_{disB}$ is at the low level. Therefore, the first switch 101 and the third switch 103 are switched on, and the second switch 102 is switched off. Accordingly, the previous voltage of the first detection terminal $V_g$ (that is, the critical voltage $V_e$) is transmitted to the second detection terminal $V_f$. Since the second switch 102 is controlled by the discharge time signal $V_{dis}$, during the transmission of the critical voltage $V_e$ to the second detection terminal $V_f$, the critical voltage $V_e$ undergoes phase shift in the discharge time $t_{disc}$. The second detection terminal $V_f$ detects a buffer signal $V_{a'}$ that has an amplitude equal to the critical voltage $V_e$ and occurs in synchronization to the discharge time signal $V_{dis}$. The buffer 105 is used for adjusting the buffer signal $V_{a'}$ and outputting the square wave signal $V_a$.

Figure 7:
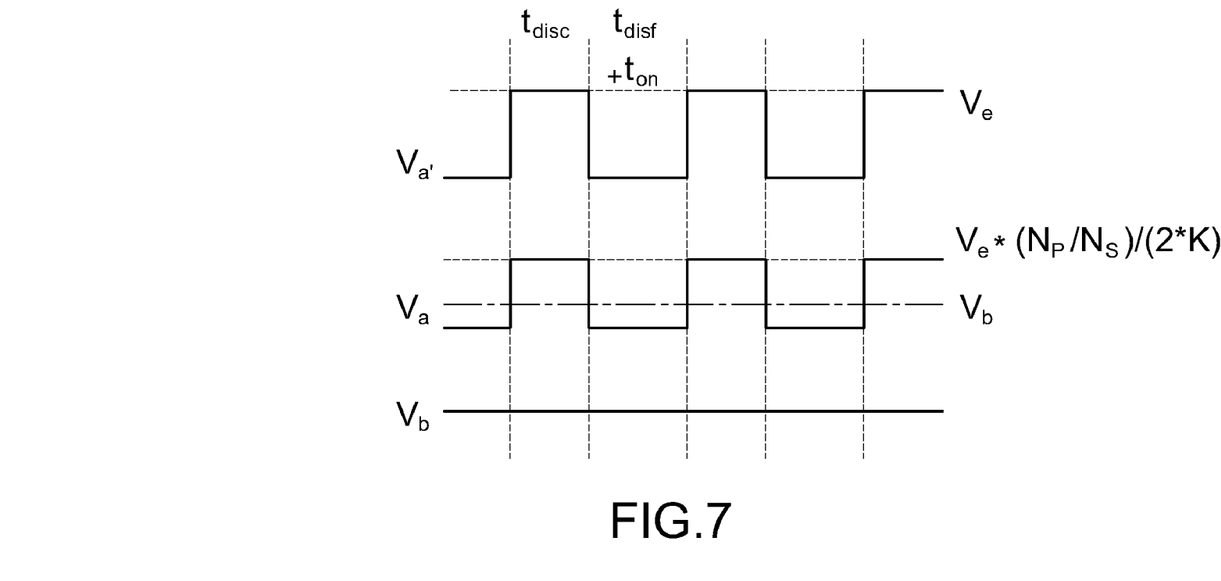
FIG. 7 is a diagram depicting signal waveforms of a control circuit according to an embodiment of the present invention.

FIG. 7 is a diagram showing waveforms of the buffer signal $V_{a'}$ and the square wave signal $V_a$.

The amplitude of the square wave signal $V_a$ is A times the amplitude of the buffer signal $V_{a'}$, and the square wave signal $V_a$ is also synchronized to the discharge time signal $V_{dis}$, wherein $A=(N_P/N_S)/(2*K)$, and K have a value equal to that of the detection resistor $R_S$.

Therefore, the amplitude of the square wave signal $V_a$ is adjusted to $V_e*(N_P/N_S)/(2*K)$.

Then, before the switching signal $V_{PWM}$ is again switched to the high level, the output current waveform reconstruction circuit 100 still operates in the low-level time interval $t_{disf}$. During the low-level time interval $t_{disf}$, the switching signal $V_{PWM}$ is at the low level, the discharge time signal $V_{dis}$ is at the low level, and the inverse discharge time signal $V_{disB}$ is at the high level. Therefore, the first switch 101 and the second switch 102 are switched on, and the third switch 103 is switched off. At this time, the first detection terminal $V_g$ fails to detect any signal, and the second detection terminal $V_f$ is grounded.

Therefore, in a continuous operating mode, the output current waveform reconstruction circuit 100 repeatedly performs signal processing of sampling and holding and phase shift on the critical voltage $V_e$, and finally the output current waveform reconstruction circuit 100 outputs a square wave signal $V_a$ that has an amplitude corresponding to the critical voltage $V_e$ and occurs in synchronization to the discharge time signal $V_{dis}$. Based on this feature, the square wave signal $V_a$ has a waveform corresponding to a waveform of the output current $I_o$. That is to say, the output current waveform reconstruction circuit 100 can be used for reproducing a waveform corresponding to the output current $I_o$.

Figure 6:
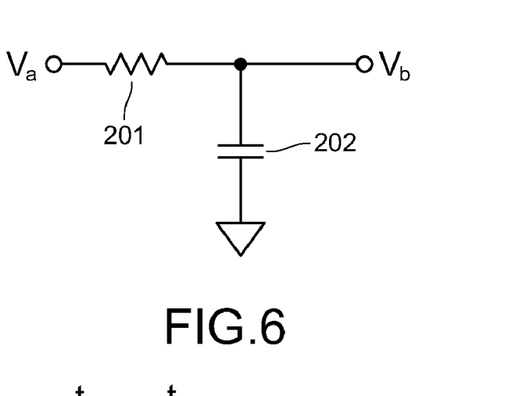
FIG. 6 is a schematic view of a low-pass filter according to an embodiment of the present invention.

As shown in FIG. 6, the low-pass filter 200 comprises a first resistor 201 and a second capacitor 202. The first resistor 201 is connected between the output current waveform reconstruction circuit 100 and the error amplifier 300. The first resistor 201 is used for receiving the square wave signal $V_a$.

The second capacitor 202 is connected to a node between the first resistor 201 and the error amplifier 300. Since the second capacitor 202 has a reactance function and is connected in parallel with the output current waveform reconstruction circuit 100, the second capacitor 202 can be used for filtering out high-frequency components of the square wave signal $V_a$.

Therefore, the low-pass filter 200 can be used for filtering out the high-frequency components of the square wave signal $V_a$ and outputting a DC signal $V_b$ based on the properties of the first resistor and the second capacitor.

For a relation between the waveforms of the DC signal $V_b$, the square wave signal $V_a$ and the buffer signal $V_{a'}$, reference may also be made to FIG. 7.

According to an embodiment of the present invention, the isolated primary circuit regulator 20 can switch the transformer 10 by using the switching signal $V_{PWM}$. Since the output current $I_o$ of the power supply may be construed as an average current generated at the secondary side of the transformer 10 in one period T of the switching signal $V_{PWM}$, the output current $I_o$ may be expressed by Equation (3).

$$I_o=(I_{spk}*t_{disc})/(2*T) \qquad (3)$$

According to Equations (1) and (2), Equation (3) may be modified to Equation (4) below.

$$I_o=(N_P/N_S)*(V_e*t_{disc}/R_S)/(2*T) \qquad (4)$$

Therefore, it can be seen from Equation (4) that, the output current $I_o$ of the power supply can be stabilized and adjusted by the isolated primary circuit regulator.

Accordingly, the isolated primary circuit regulator of the present invention can switch the transformer by using the switching signal, stabilize and adjust the output current of the power supply. Moreover, the isolated primary circuit regulator of the present invention further uses the control circuit having the feedback design to replace the conventional waveform detector and integrator. Therefore, the isolated primary circuit regulator of the present invention does not directly detect the switching voltage signal generated at the primary side of the transformer, but indirectly obtains the equivalent critical voltage. Thus, the isolated primary circuit regulator according to an embodiment of the present invention not only can stabilize and adjust the output current of the power supply, but can further prevent voltage spike caused by sudden switching of a switch.

What is claimed is:

1. An isolated primary circuit regulator, applied to a primary side of a transformer, the isolated primary circuit regulator comprising:
   a discharge time detector, connected to the transformer, for detecting a discharge time of a switching current generated at a secondary side of the transformer, and outputting a discharge time signal and an inverse discharge time signal;

an oscillator, for generating an oscillation signal;

a control circuit, connected to the discharge time detector, for performing signal processing of output current waveform reconstruction, filtering, amplification and comparison on a critical voltage according to the discharge time signal and the inverse discharge time signal, and outputting an adjustment signal, wherein the critical voltage is corresponding to a peak value of a switching voltage signal generated at the primary side of the transformer; and a pulse width modulator, comprising a first input terminal and a second input terminal, wherein the first input terminal is connected to the control circuit, the second input terminal is connected to the oscillator, the pulse width modulator outputs a switching signal, the switching signal has a duty cycle and a frequency corresponding to the oscillation signal and the adjustment signal, and the adjustment signal is used for resetting the pulse width modulator, wherein the control circuit comprises:

an output current waveform reconstruction circuit, for outputting a square wave signal according to the discharge time signal, the inverse discharge time signal, the switching signal and the critical voltage, wherein the square wave signal has an amplitude corresponding to the critical voltage, the square wave signal occurs in synchronization to the discharge time signal, and the square wave signal has a waveform corresponding to a waveform of an output current;

a low-pass filter, for filtering the square wave signal to output a direct current (DC) signal;

an error amplifier, for amplifying the DC signal into the critical voltage; and a comparator, connected between the error amplifier and the pulse width modulator, for comparing the critical voltage to the switching voltage signal to generate the adjustment signal.

2. The isolated primary circuit regulator according to claim 1, wherein the switching voltage signal is a magnetizing current signal.

3. The isolated primary circuit regulator according to claim 1, wherein the output current waveform reconstruction circuit comprises:

a first switch, having an input terminal connected to the critical voltage, wherein the first switch is controlled by the switching signal;

a second switch, connected in series with the first switch, wherein the second switch is controlled by the discharge time signal;

a third switch, connected to the second switch, and connected in parallel with the first switch and the second switch, wherein the third switch is controlled by the inverse discharge time signal;

a first capacitor, connected to a first node between the first switch and the second switch, for storing the critical voltage; and a buffer, connected to a second node between the second switch and the third switch, for buffering and outputting the square wave signal.

4. The isolated primary circuit regulator according to claim 1, wherein the low-pass filter comprises:

a first resistor, connected between the output current waveform reconstruction circuit and the error amplifier, for receiving the square wave signal; and a second capacitor, connected to a node between the first resistor and the error amplifier, for filtering out a high frequency components of the square wave signal.

* * * * *